Nov. 26, 1968

H. F. GREINER 3,413,008

SHAFT SEAL

Filed Jan. 26, 1965

INVENTOR.
HAROLD FREDERIC GREINER
BY
William Frederick Werner
ATTORNEY

Nov. 26, 1968  H. F. GREINER  3,413,008
SHAFT SEAL

Filed Jan. 26, 1965  5 Sheets-Sheet 3

INVENTOR.
HAROLD FREDERIC GREINER
BY
William Frederick Werner
ATTORNEY

Nov. 26, 1968  H. F. GREINER  3,413,008
SHAFT SEAL

Filed Jan. 26, 1965  5 Sheets-Sheet 4

INVENTOR.
HAROLD FREDERIC GREINER
BY
William Frederick Werner
ATTORNEY

Nov. 26, 1968   H. F. GREINER   3,413,008
SHAFT SEAL
Filed Jan. 26, 1965   5 Sheets-Sheet 5

INVENTOR.
HAROLD FREDERIC GREINER
BY William Frederick Werner
ATTORNEY

3,413,008
SHAFT SEAL
Harold Frederic Greiner, Cranston, R.I., assignor to Sealol, Inc., Warwick, R.I., a corporation of Delaware
Filed Jan. 26, 1965, Ser. No. 428,147
1 Claim. (Cl. 277—58)

ABSTRACT OF THE DISCLOSURE

This invention relates to propeller shaft bearing seals of the type which oscillate under influence of shaft vibration and/or whip.

---

This invention relates to shaft seals and more particularly to shaft seals located on the propeller shafts of ships.

An object of the present shaft seal is to retain lubricating oil on the bearings in a stern tube while the propeller shaft is subjected to whip, vibration and rotation.

Another object of the present invention is to provide a shaft seal which is self compensating to accommodate the propeller shaft movements of whip, vibration and rotation and thereby maintain water tight integrity while excluding foreign particles such as sand, grit, dirt or sea water from reaching the propeller shaft bearings.

And still another object of the present invention is to provide a fluid tight seal between a rotating member and a stationary member whereby the stationary member is provided with a bearing and resilient fluid sealing elements which are oscillatable in response to the movement of the rotating member.

Propeller shafts project a great distance from the hull of a vessel in order to place the propeller in an advantageous position in the water behind the vessel. This great distance causes the undesirable conditions of shaft whip, rapid bearing wear, shaft vibration and sea water penetration of the hull and propeller shaft bearings.

Vessels traversing the oceans require propeller shaft bearings which are long wearing and which posses sea water tight integrity.

The present invention solves the propeller shaft problem by providing a self compensating shaft seal which accommodates and compensates for propeller shaft whip, vibration, rotation, and bearing wear, while excluding sea water, and retaining an oil bath around the propeller shaft bearings.

Other objects of the present invention will become apparent in part and be pointed out in part in the following specification and claims.

Like reference numerals refer to like parts in the accompanying drawings in which.

Figure 1:
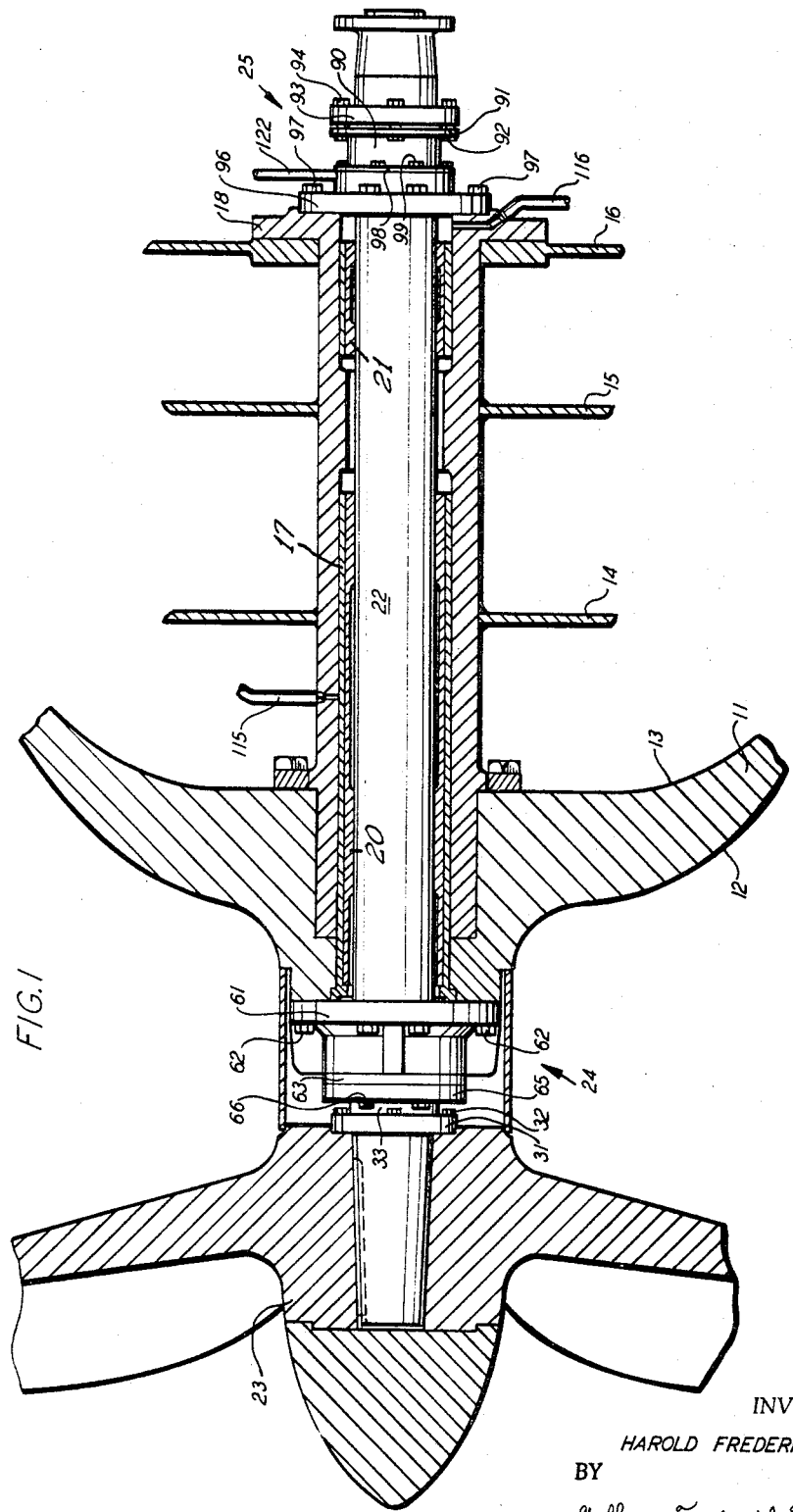
FIGURE 1 is a longitudinal cross sectional view through a propeller, propeller shaft, stern tube, propeller shaft bearings and hull of a vessel.

FIGURE 1 diagrammatically illustrates a ship's hull 11 with surface 12 exposed to sea water and surface 13 facing the inboard space of the vessel. The vessel's ribs are indicated at 14, 15, 16. A stern tube 17 provided with an inboard or forward flange 18 is supported in the ship's hull 11 and in ribs 14, 15, 16. Axially, stern tube 17 is provided with an aft stern tube bearing 20 and a forward stern tube bearing 21. A propeller shaft 22 having a propeller 23 mounted thereon is rotatively mounted in aft 20 and forward 21 stern tube bearings.

Reference numeral 24 generally indicates the aft shaft seal and 25 generally indicates the forward shaft seal, which are the subject of the present invention.

Figure 2:
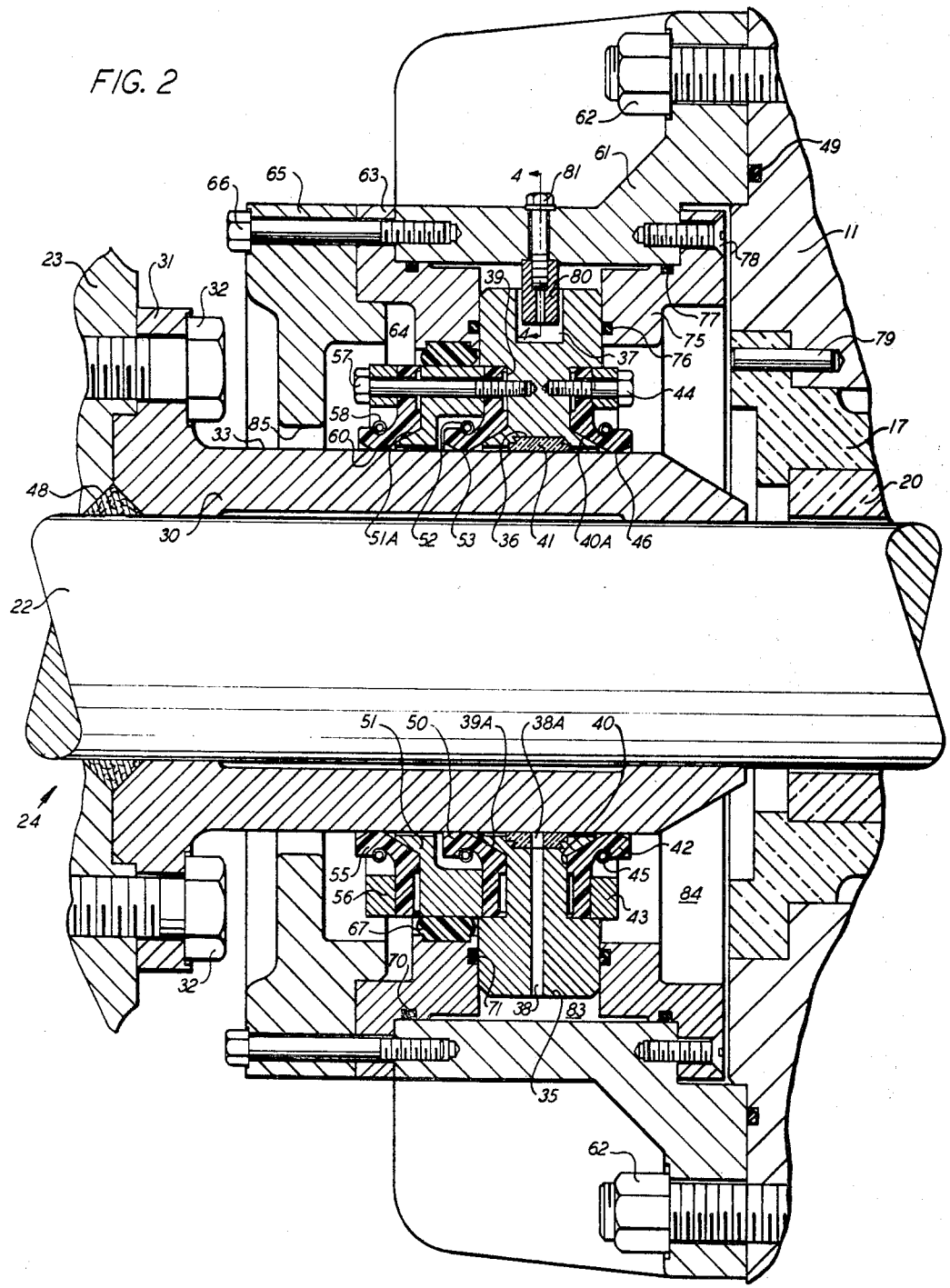
FIGURE 2 is an enlarged fragmentary longitudinal sectional view of the aft end of the shaft, showing the shaft seal assembly located outboard of the vessel where it serves the functions of excluding sea water while retaining oil on the propeller shaft bearing.

Reference is now made to FIGURE 2. An aft sleeve 30 provided with an enlarged end 31 is supported upon (propeller) shaft 22 and is fastened to propeller 23 by means of bolts 32 so as to rotate with shaft 22. Sleeve 30 provides a sealing or sleeve surface 33.

A guide ring 35 is provided with a circular dove tail groove 36, a guide ring key orifice 37, an oil orifice 38, an aft circular groove 39 having a circular aft shoulder 39A, and a forward circular groove 40 having a circular forward shoulder 40A. A dove tail shaped guide ring bearing 41 is fastened in circular dove tail groove 36 and is supported upon sealing surface 33 of sleeve 30.

A forward sealing ring shaped as a resilient lip seal 42 is located and fastened in forward circular groove 40 by means of a circular forward shoulder 40A and forward clamp ring 43 which is held in position by bolts 44 secured in guide ring 35. A garter spring 45 provides pressure to insure that sealing surface 46 will engage sealing surface 33 in fluid tight relationship.

An aft sealing ring shaped as a resilient lip seal 50 is located and held in aft circular groove 39 by means of circular aft shoulder 39A and aft support 51. A garter spring 52 provides pressure to insure that sealing surface 53 will engage sealing or sleeve surface 33 in fluid tight relationship.

A water sealing ring or resilient seal 55 is supported by and fastened to aft support 51 by means of circular shoulder 51A and aft clamp ring 56 which is held in position by bolts 57 which pass through aft clamp ring 56, water sealing ring or resilient seal 55, aft support 51, aft resilient lip seal 50 and are fastened in guide ring 35. A garter spring 58 provides pressure to ensure that sealing surface 60 will engage sealing surface 33 in fluid tight relationship.

An aft seal housing 61 is fastened to the ship's hull 11 by means of bolts 62. A bracket 63 provided with a circular groove 64 is positioned against the end of aft seal housing 61. A cover 65 abutts bracket 63. Bolts 66 pass through cover 65, bracket 63 and are fastened in aft seal housing 61. A dirt excluding washer 67 is fastened in circular groove 64 and engages aft support 51 to thereby prevent dirt from passing therebetween. Bracket 63 is provided with circular grooves which house O-rings 70, 71. O-ring 70 engages aft seal housing 61 to thereby provide a fluid tight seal. O-ring 71 engages guide ring 35 to thereby provide a fluid tight seal.

A forward support 75 provided with O-rings 76 and 77 is fastened to aft seal housing 61 by means of screws 78. Forward support 75 abuts guide ring 35 to locate and oscillatingly hold guide ring 35 between forward support 75 and bracket 63. O-ring 77 engages aft seal housing 61 to provide a fluid tight seal. O-ring 76 engages guide ring 35 to provide a fluid tight seal. Dowel pins 79 locate stern tube 17 in relation to ship's hull 11.

Bolts 81 which pass through aft seal housing 61 engage a guide ring key 80 located in guide key ring orifice 37 to thereby prevent rotation of guide ring 35 and forward resilient lip seal 42, aft resilient lip seal 50, and resilient seal 55.

Guide ring 35, aft seal housing 61, bracket 63 and forward support 75 form an aft oil chamber 83 which is made fluid tight by O-rings 77, 76, 71 and 70. Lubricating oil is placed in chamber 83 where it passes through oil orifices 38, 38A to sealing surface 33 where the oil lubricates the engagement of guide ring bearing 41, a stationary surface, with sealing surface 33, a revolving surface.

It will be noted in FIGURE 2 that guide ring bearing 41 is provided with an oil orifice 38A aligned with oil orifice 38. Sealing surfaces 46, 53 prevent the lubricating oil spreading outwardly from between guide ring bearing 41 and sealing surface 33 from going past said sealing surfaces 46, 53. Water excluding resilient seal 55 prevents sea water which passes through axial opening 85 in cover 65 from seeping between seal 55 and sealing surface 33. Resilient dirt excluding washer 67 may or may not also exclude sea water from passing between washer 67 and aft support 51. In the event washer 67 is not fluid tight, then O-ring 71 and aft resilient lip seal 50 forced against guide ring 35 by bolt 57 will provide fluid tight integrity from sea water and for lubricating oil in chamber 83.

A chamber 84, as will presently appear, may be filled with lubricating oil. In that event, O-ring 49 between seal housing 61 and ships hull 11, O-ring 76 and forward resilient lip seal 42 held against guide ring 35 by means of bolt 44 provide fluid tight integrity for chamber 84.

A fluid tight packing 48 is interposed between shaft 22, sleeve 30 and propeller 23 to prevent water from seeping along shaft 22.

It will also be observed that guide ring 35, to which is attached forward resilient lip seal 42, aft resilient lip seal 50, water excluding resilient seal 55 and guide ring bearing 41, is oscillatingly mounted between forward support 75 and bracket 80 so that eccentric movement of shaft 22 transferred through sleeve 30 to guide ring bearing 41 allows the guide ring bearing 41 to accommodate the eccentric movement of shaft 22.

In effect guide ring 35 has free vertical sliding movement between forward support 75 and bracket 63 and a limited amount of horizontal and twisting movement between forward support 75 and bracket 63. The distance between forward support 75 and bracket 63 is slightly greater than the width of guide ring 35 to provide for the horizontal twisting and vertical movement of guide ring 35. O-rings 76 and 71 provide and maintain fluid tight sealing between guide ring 35 and forward support 75 and bracket 63, respectively.

Figure 3:
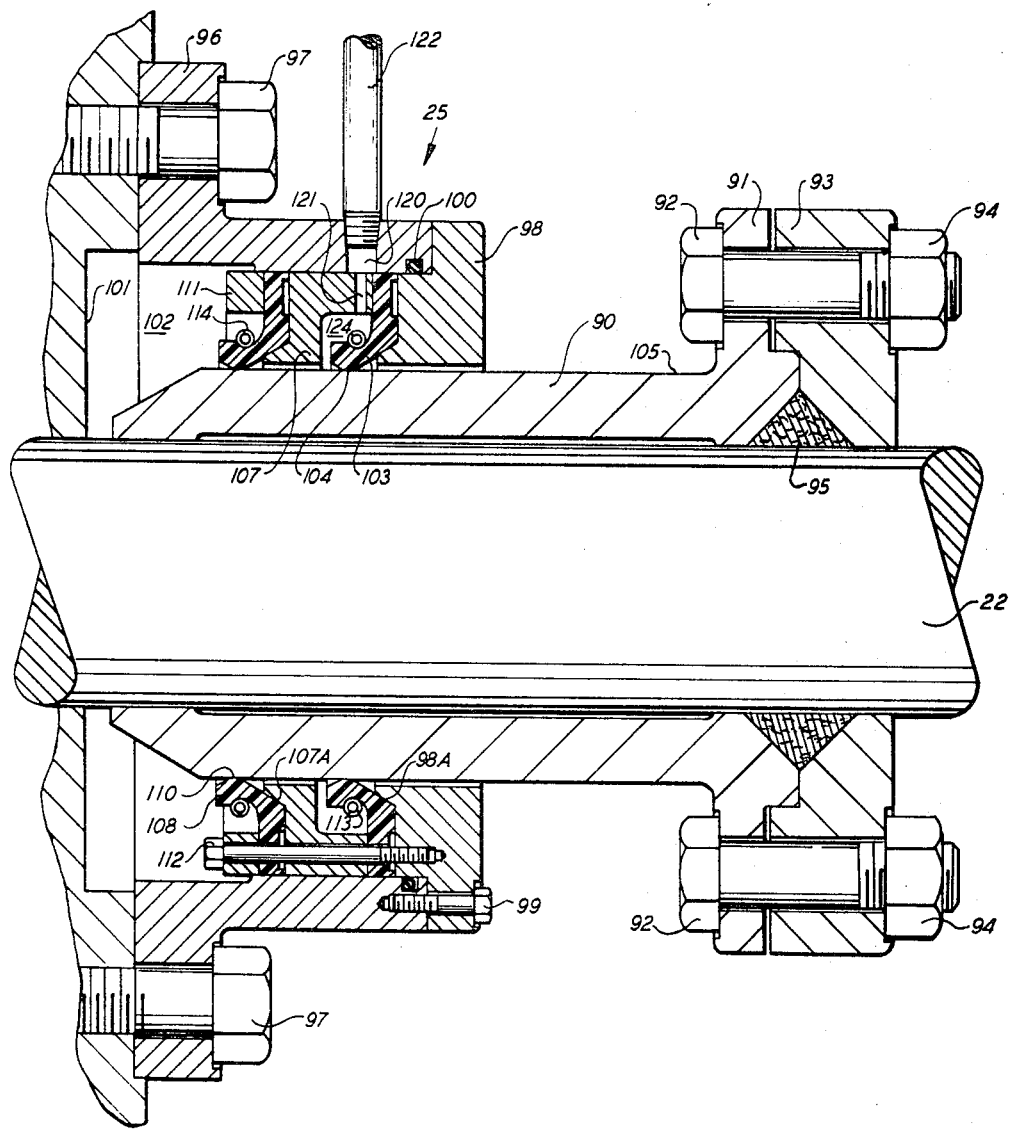
FIGURE 3 is an enlarged fragmentary longitudinal sectional view of the inboard end of the stern tube showing the shaft seal assembly.
Figure 4:
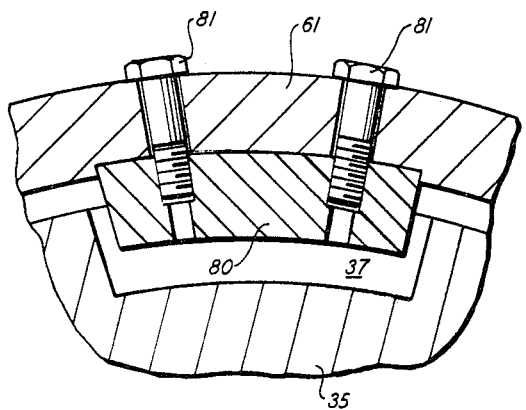
FIGURE 4 is a fragmentary cross sectional view taken on line 4—4 of FIGURE 2 showing the guide ring key located in the guide ring key orifice.

FIGURE 3 illustrates the forward shaft seal 25, consisting of a forward sleeve 90 provided with an enlarged end 91. Sleeve 90 is supported upon (propeller) shaft 22. It has been found that aft sleeve 30 and forward sleeve 90 are subject to wear and must therefore be easily and inexpensively replaced. Sleeves 30 and 90 are provided to prevent the wear from taking place on shaft 22 which is a time consuming and costly replacement item. It is obvious that sleeves 30 and 90 may be dispensed with and the outside surface of the shaft will then be engaged the same as sealing surface 33.

Bolts 92 fasten enlarged end 91 to packing follower 93 by means of nuts 94. A fluid tight packing 95 is interposed between forward sleeve 90 and packing follower 93 to grasp shaft 22 in fluid tight engagement.

A forward seal housing 96 is fastened to the inboard end of stern tube 17 by means of bolts 97. An inboard cover 98 provided with a circular shoulder 98A is fastened to forward seal housing 96 by means of bolts 99. An O-ring 100 is interposed between inboard cover 98 and forward seal housing 96 to provide a fluid tight seal.

The end at 101 of the stern tube, forward seal housing 96 and inboard cover 98 define a forward oil chamber 102. A second resilient lip oil seal 103 having a sealing face 104 is placed in forward oil chamber 102 with sealing face 104 in engagement with sealing surface 105 and with the seal 103 abutting both the forward seal housing 96 and inboard cover 98 and with a portion of seal 103 engaging circular shoulder 98A to be supported thereby. A seal separator 107 provided with a circular shoulder 107A is supported in forward seal housing 96 and abuts second resilient lip oil seal 103 to hold it against inboard cover 98. A first resilient lip oil seal 108 provided with a sealing surface 110 is positioned adjacent lip seal separator 107 to be supported thereby. A clamping ring 111 is placed against first resilient lip oil seal 108. Bolts 112 pass through clamping ring 111, first resilient lip oil seal 108, lip seal separator 107, and second resilient lip oil seal 103, to be fastened to inboard cover 98 to thereby attach said clamping ring 111, seal 108, separator 107 and seal 103 to inboard cover 98. A garter spring 113 provides pressure to ensure that sealing face 104 will engage sealing surface 105 in fluid tight relationship. Garter spring 114 provides pressure to ensure that sealing surface 110 will engage sealing surface 105 in fluid tight relationship. Forward seal housing 96 and seal separator 107 are provided with aligned oil orifices 120, 121, respectively. An oil line 122 is fastened to housing 96 at oil orifice 120. An oil lubricating cavity 124 is formed by the contour of seal separator 107 and resilient lip oil seals 103, 108 whereby sealing surfaces 104 and 110 may be lubricated if it is so desired.

Thus it will be seen that aft oil chamber 84 and forward oil chamber 102 are located at opposite ends of stern tube 17. A lubricating oil inlet 115 admits lubricating oil to aft stern tube bearing 20 and to forward stern tube bearing 21 whereby propeller shaft 22 and bearings 20, 21 are oil lubricated. A lubricating oil outlet at 116 is provided in stern tube 17 whereby oil under pressure may be forced through oil inlet 115 to oil outlet 116. The oil will be retained in chambers 83 and 102. Thus bearings 20 and 21 are assured of a long life being duly lubricated.

Figure 5:
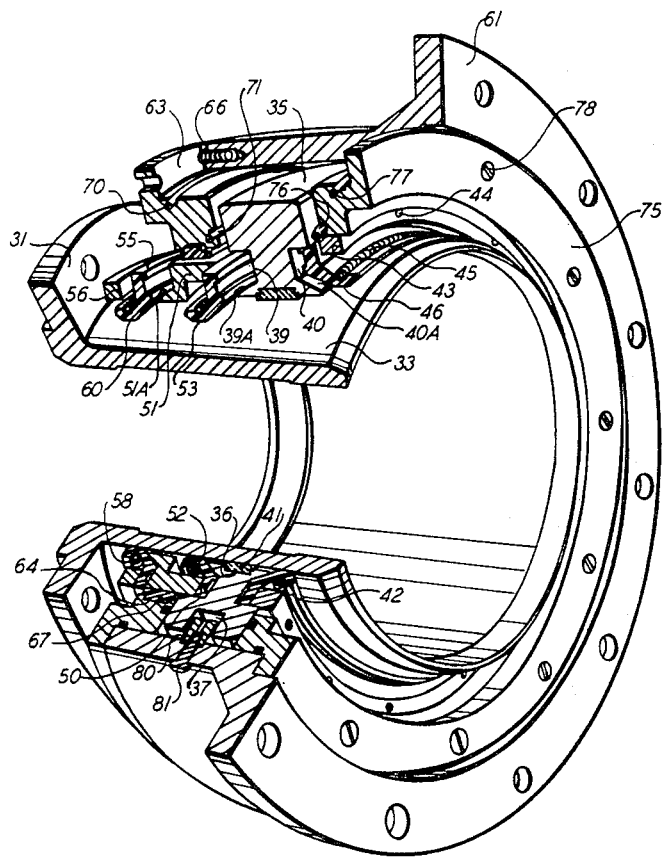
FIGURE 5 is a perspective view of the aft shaft seal assembly, as an article of manufacture, with a segment broken away to show the detail construction and interrelation of the several parts.
Figure 6:
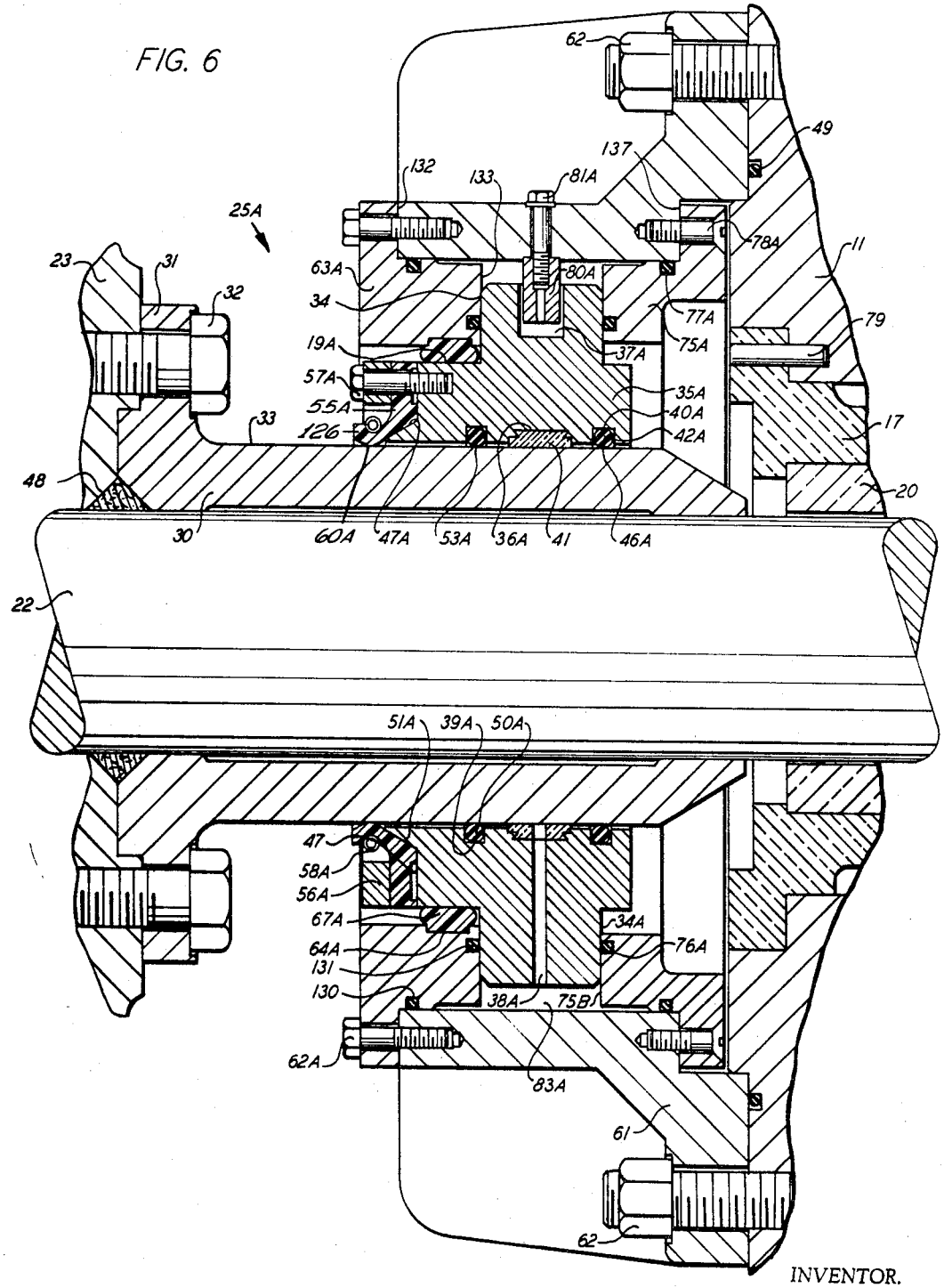
FIGURE 6 is a view similar to FIGURE 2 showing a modified form of construction of the aft shaft seal assembly.

FIGURE 6 illustrates a modified form of aft shaft seal 25 shown in FIGURES 2 and 5 and is generally indicated by reference numeral 25A. Shaft seal housing 61, ships hull 11, stern tube 17, stern tube bearing 20, sleeve 30, sealing surface 33, enlarged end 31 and propeller hull 23 provide the identical environment for both aft shaft seal 25 and modified form shaft seal 25A.

Guide ring 35A is provided with a circular groove 36A, a guide ring key orifice 37A, an oil orifice 38A, a first circular recess 39A, a second circular recess 40A, and aft support or shoulder 51A having a washer engaging surface 19A, a first bearing surface 34, a second bearing surface 34A and a seal engaging surface 47 provided with a shoulder 47A.

A guide ring bearing 41 is fastened in circular groove 36A and engages sealing surface 33.

A resilient seal 55A having an extension or lip 126 provided with a sealing surface 60A is fastened to seal engaging surface 47 by means of a bolt 57A secured in guide ring 35A with extension 126 engaging shoulder 47A for a portion of its length. A garter spring 58A located in a groove in extension 126 provides pressure to insure that sealing surface 60A will engage sealing surface 33 in fluid sealing relationship.

Bracket 63A is provided with a circular groove 64A, circular recesses 130, 131, a step at 132 and a first guide ring surface 133. Bolts 62A fastened in seal housing 61 secure bracket 63A to seal housing 61 through step 132. Fluid tight packing which may take the form of O-rings is located in circular recesses 130, 131. A washer 67A is fastened in circular groove 64A and engages washer engaging surface 19A to function as a dirt excluder and under desired circumstances be made to be a fluid tight seal through the use of a fluid tight packing washer. An aft sealing ring 50A having a sealing surface 53A is located and fastened in first circular recess 39A with sealing surface 53A engaging sealing surface 33 in fluid sealing relationship. A forward sealing ring 42A having sealing surface 46A is located and fastened in second circular recess 40A with sealing surface 46A engaging sealing surface 33 in fluid sealing relationship.

Forward support 75A provided with circular packing recesses 76A, 77A, a second guide ring surface 75B and a step at 137 is fastened to seal housing 61 by means of screws 78A. Fluid tight packing is located in circular packing recesses 76A and 77A.

Guide ring 35A is mounted for oscillating movement between second guide ring surface 75B, first guide ring surface 133 by means of second bearing surface 34A and first bearing surface 34, respectively. The fluid tight packings in circular packing recess 76A and circular recess 131 provide fluid tight seals on either side of guide ring 35A. Bolts 81A which pass through aft seal housing 61 engage a guide ring key 80A located in guide ring orifice 37A to thereby prevent rotation of guide ring 35A. As previously described for the specie shown in FIGURES 2 and 5 an oil chamber 83A is provided to supply lubricating oil through oil orifice 38A to guide ring bearing 41.

Having shown and described preferred embodiments of the present invention, by way of example, it should be realized that structural changes could be made and other examples given without departing from either the spirit or scope of this invention.

What I claim is:

1. A shaft seal comprising a guide ring provided with a bearing surface, a guide ring key orifice, a forward sealing ring provided with a forward sealing surface, means fastening said forward sealing ring to said guide ring, an aft sealing ring provided with an aft sealing surface, an aft support having an axially extending washer engaging surface, a water sealing ring provided with a sealing surface, means fastening said aft sealing ring, said aft support and said water sealing ring to said guide ring, a seal housing, a bracket provided with a first radially extending guide ring surface, means fastening said bracket to said seal housing in fluid tight relationship, a washer, means fastening said washer to said bracket with said washer engaging said axially extending washer engaging surface in compression, a forward support provided with a second radially extending second guide ring surface, means fastening said forward support to said seal housing in fluid tight relationship, said guide ring oscillatingly mounted between said first radially extending guide ring surface and said second radially extending guide ring surface in fluid tight relationship, a guide ring key located in said guide ring key orifice, means fastening said guide ring key to said seal housing to prevent rotation of said guide ring, and axially extending rotatable member having a rotating sealing surface, said bearing surface, said forward sealing surface, said aft sealing surface and said water sealing surface engaging said rotating sealing surface.

References Cited

UNITED STATES PATENTS

| | | | |
|---|---|---|---|
| 3,169,504 | 2/1965 | Gruber | 115—.5 |

FOREIGN PATENTS

| | | |
|---|---|---|
| 557,688 | 5/1958 | Canada. |
| 1,340,799 | 9/1963 | France. |
| 1,183,399 | 12/1964 | Germany. |
| 134,525 | 2/1952 | Sweden. |

LAVERNE D. GEIGER, *Primary Examiner.*

J. S. MEDNICK, *Assistant Examiner.*